(12) United States Patent
Joo et al.

(10) Patent No.: US 7,458,712 B2
(45) Date of Patent: Dec. 2, 2008

(54) LIGHT GUIDE PLATE AND LIQUID CRYSTAL DISPLAY DEVICE HAVING THE SAME

(75) Inventors: Byung-yun Joo, Seoul (KR); Jin-soo Kim, Seoul (KR); Ju-hwa Ha, Seoul (KR); Min-young Song, Seoul (KR); Jung-wook Paek, Suwon-si (KR); Jin-sung Choi, Cheonan-si (KR)

(73) Assignee: Samsung Electronics Co., Ltd, Suwon_Si, Gyeonggi_Do (KR)

( * ) Notice: Subject to any disclaimer, the term of this patent is extended or adjusted under 35 U.S.C. 154(b) by 0 days.

(21) Appl. No.: 11/774,260

(22) Filed: Jul. 6, 2007

(65) Prior Publication Data

US 2008/0013015 A1    Jan. 17, 2008

(30) Foreign Application Priority Data

Jul. 10, 2006    (KR) ...................... 10-2006-0064362

(51) Int. Cl.
 *F21V 8/00*    (2006.01)

(52) U.S. Cl. ........................ 362/623; 362/625; 362/561

(58) Field of Classification Search ................. 362/623, 362/624, 625, 626, 555, 561
See application file for complete search history.

(56) References Cited

U.S. PATENT DOCUMENTS 6,132,053 A * 10/2000 Sendova ..................... 362/626
6,415,531 B1 * 7/2002 Ohtsuki et al. ................. 36/31
6,454,452 B1 * 9/2002 Sasagawa et al. ........... 362/561

FOREIGN PATENT DOCUMENTS

| JP | 7-198954 | 8/1995 |
| KR | 1020020064227 | 7/2002 |
| KR | 1020050095069 | 9/2005 |

* cited by examiner

*Primary Examiner*—Laura Tso
(74) *Attorney, Agent, or Firm*—F. Chau & Associates, LLC

(57) ABSTRACT

A liquid crystal display device includes a liquid crystal display panel. A light guide plate is disposed at a rear side of the liquid display panel. The light guide plate has an exiting surface facing the liquid crystal panel and a reflecting surface opposite to the exiting surface. The reflecting surface has a plurality of grooves. A light source unit is disposed along at least one side of the light guide plate. The reflecting surface includes a first region formed the groove of a first length and a second region formed with groove of a second length shorter than the first length.

26 Claims, 14 Drawing Sheets

LIGHT GUIDE PLATE AND LIQUID CRYSTAL DISPLAY DEVICE HAVING THE SAME

CROSS-REFERENCE TO RELATED APPLICATIONS

This application claims priority to Korean Patent Application No. 10-2006-0064362, filed on Jul. 10, 2006, in the Korean Intellectual Property Office, the disclosure of which is incorporated herein by reference in its entirety.

BACKGROUND OF THE INVENTION

1. Technical Field

The present disclosure, relates to a liquid crystal display and more particularly to a light guide plate and liquid crystal display device having the same.

2. Discussion of the Related Art

Recently, liquid display (LCD) devices, PDP (plasma display panel) devices, OLED (organic light emitting diode) devices, etc. have been developed to replace conventional cathode ray tube (CRT) devices.

Among the above display devices, the liquid crystal display device includes a liquid crystal display panel and a backlight unit. The liquid crystal display panel includes a thin film transistor substrate, a color filter substrate and a liquid crystal layer disposed between the two substrates. The liquid crystal display panel is not a light emitting device but is supplied with light from the backlight unit. The amount of light transmitted from the backlight unit through the liquid crystal display panel is controlled by a state of liquid crystal arrangement.

The backlight unit is divided into an edge type or a direct type by a location of a light source. The edge type backlight unit is provided with the light source at a side surface of the liquid crystal display device and is mainly applied to small liquid crystal devices like portable and desktop computers. Such an edge type backlight unit has a good light uniformity, a long durability and allows for a slimmer liquid crystal display device.

A light guide plate is used in the edge type backlight units to lead incident light from the side surface toward the liquid crystal display panel. A pattern is formed on a reflecting surface of the light guide plate to increase a luminance in a liquid crystal display panel direction.

It may be difficult to supply light of uniform luminance to a liquid crystal display panel through the pattern-formed light guide plate and thus display quality of LCD displays using edge type backlighting may be inferior to LCD displays with direct type backlighting.

SUMMARY OF THE INVENTION

Accordingly, it is an aspect of the present disclosure to provide a liquid crystal display device having an excellent displaying quality.

It is another aspect of the present disclosure to provide a light guide plate supplying light of high and uniform luminance.

A liquid crystal display device includes a liquid display panel. A light guide plate is disposed at a rear side of the liquid display panel. The light guide plate has an exiting surface facing the liquid crystal panel and a reflecting surface opposite to the exiting surface. The reflecting surface is formed with grooves. A light source unit is disposed along at least one side of the light guide plate. The reflecting surface comprises a first region formed with a groove of a first length and a second region formed with a groove of a second length. The second length is shorter than the first length.

A liquid crystal display device includes a liquid crystal display panel. A light guide plate is disposed at a rear side of the liquid display panel. The light guide plate has an exiting surface facing the liquid crystal panel and a reflecting surface opposite to the exiting surface. The light guide plate comprises groves. A pair of light source units is provided. The light guide plate is provided between the pair of light source units. The reflecting surface of the light guide plate comprises a first region and a second region surrounding the first region. The second region has a groove density higher than a groove density of the first region.

A light guide plate has a reflecting surface formed with a groove. The reflecting surface includes a first region and a second region. The second region has a higher groove density than the first region. The second region surrounds the first region.

BRIEF DESCRIPTION OF THE DRAWINGS

The above and/or other aspects of the present disclosure will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
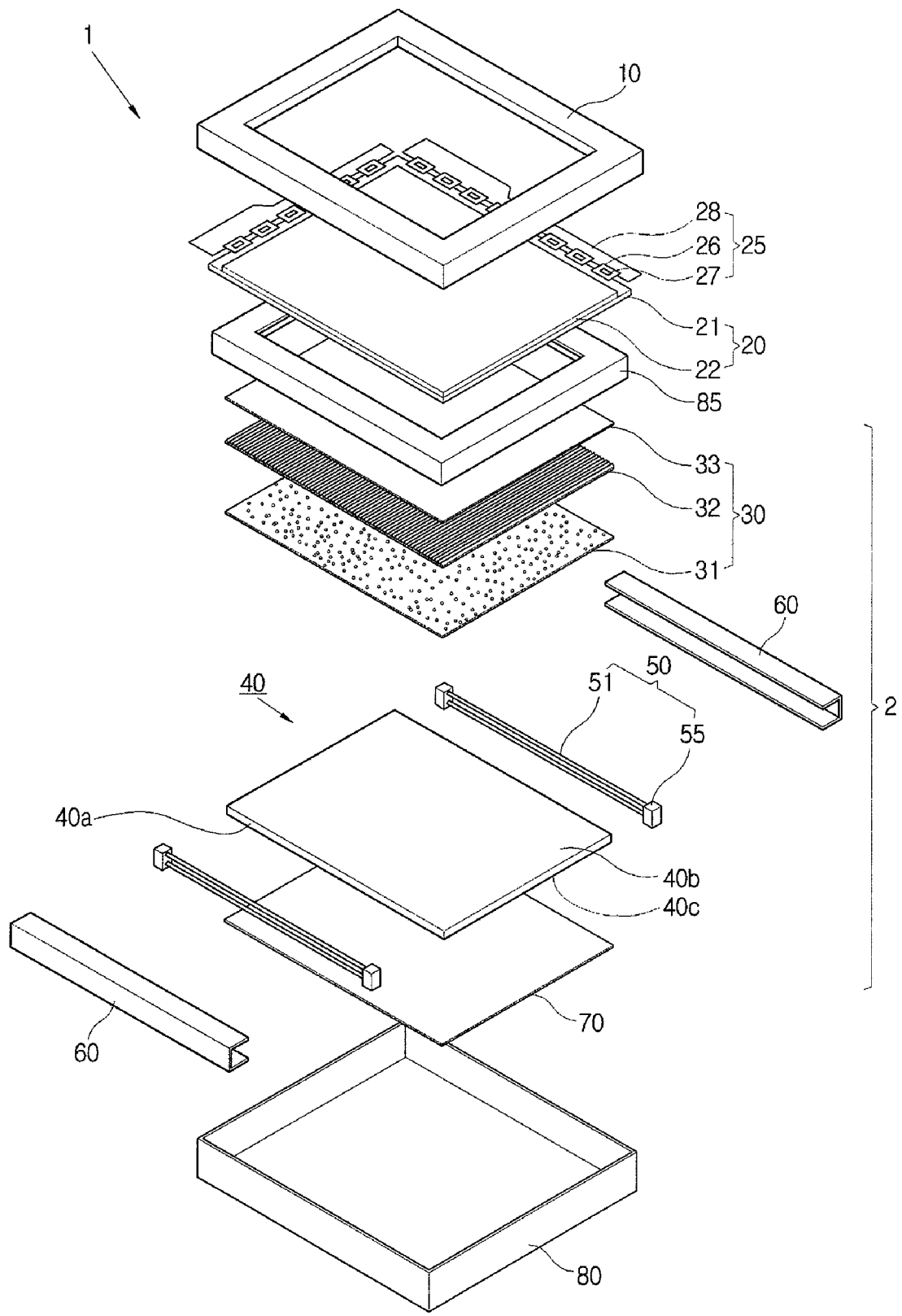
FIG. 1 is a perspective view of a disassembled liquid crystal display device according to an exemplary embodiment of the present invention.

Reference will now be made in detail to exemplary embodiments of the present invention, examples of which are illustrated in the accompanying drawings.

In the following embodiments, the same components are denoted by the same reference numerals, and explanation thereof that are provided with reference to one embodiment may be omitted in other embodiments.

A liquid crystal display device according to an exemplary embodiment of the present invention is described by referring to FIG. 1.

The liquid crystal display device 1 includes a liquid crystal display panel 20 and a backlight unit 2 disposed at a rear side of the liquid display panel 20. The backlight unit 2 includes a plurality of optical films 30 disposed at the rear side of the liquid crystal display panel 20, a light guide plate 40 also disposed at the rear side of the liquid crystal display panel 20, a pair of light source units 50 arranged along opposite sides of the light guide plate 40, and a reflecting plate 70 placed under the light guide plate 40. The liquid crystal display panel 20 is mounted in a plastic frame 85. The liquid crystal display panel 20 and the backlight unit 2 are provided between an upper holder 10 and a lower holder 80.

The liquid crystal display panel 20 includes a thin film transistor substrate 21 formed with thin film transistors thereon, and a color filter substrate 22 facing the thin film transistor substrate 21. A liquid crystal layer (not shown) is disposed between the two substrates 21 and 22. A screen image is formed by arranging arrays of liquid crystals in the liquid crystal layer of the liquid crystal display panel 20. However, since the liquid crystal display panel 20 is a non-light emitting device, the liquid crystal display panel 20 should be supplied a light by the backlight unit 2 disposed at the rear side of the liquid crystal display panel 20.

A driving unit 25 is provided in one side of the thin film transistor substrate 21 to apply a driving signal. The driving unit 25 includes a flexible printed circuit (FPC) substrate 26 connected to the liquid crystal display panel 20 with one side thereof, driving chips 27 mounted on the flexible printed circuit substrate 26, and a printed circuit board (PCB) 28 connected to the other side of the flexible printed circuit substrate 26. The illustrated driving unit 25 represents a structure made of a chip on film (COF) method, but other known methods like a tape carrier package (TCP), a chip on glass (COG), etc. are possible.

The optical film 30 disposed on a rear surface of the liquid crystal display panel 20 includes a diffusion film 31, a prism film 32 and a protection film 33.

The diffusion film 31 comprises a base plate (not shown) and a coating layer shaped like beads and formed on the base plate. The diffusion film 31 diffuses light from the light source unit 50 and supplies the diffused light to the liquid crystal display panel 20. A film overlapped with two or three diffusion films 31 can be used for the diffusion film 31.

The prism film 32 is formed with a regular array of prisms having a triangular shape on an upper surface thereof. The prism film 32 focuses the diffused light from the diffusion film 31 to be incident perpendicular to the surface of the liquid crystal display panel 20. Generally, two sheets of the prism films 32 are used and a micro prism is formed on each prism film 32 having a predetermined angle. Most of the light transmitted by the prism film 32 is progressed perpendicularly and provide a uniform luminance distribution.

The protection film 33 disposed on the top of the optical film protects a prism film 32 from scratching.

The light guide plate 40 include an acryl group resin, for example, polymethylmethacrylate (PMMA) and poly methylstyrene (copolymer of methylmethacrylate and styrene) and uniformly supplies light from the light source unit 50 to the diffusion film 31.

The light guide plate 40 includes an incident side surface 40a facing the light source unit 50, an exiting surface 40b facing the diffusion film 31 and a reflecting surface 40c provided parallel with the exiting surface 40b. The reflecting surface 40c is formed with a groove 41 (see FIG. 2A), the groove 41 is discussed in detail below.

The light source unit 50 is provided as a pair of light source elements that face each other. The light guide plate 40 is between the two light source elements. Each light source element of the light source unit 50 includes a lamp 51, and lamp holders 55 disposed at both ends of the lamp 51. The light source unit 50 may include cold cathode fluorescent lamps (CCFL) and/or an external electrode fluorescent lamps (EEFL).

A light source cover 60 wraps the light source 50 and reflects the light from the light source unit 50 toward the light guide plate 40. The light source cover 60 may include two layers, an inner polyethylene terephthalate (PET) layer facing the light source 50 and an outer heat conducting aluminum layer.

The reflecting plate 70 is disposed under the light guide plate 40 and supplies light to the light guide plate 40 by re-reflecting the light directing downward. The reflecting plate 70 includes a plastic material, for example, polyethylene terephthalate (PET) and polycarbonate (PC).

The aforementioned liquid crystal display panel 20 and the backlight unit 2 are provided between the upper holder 10 and the lower holder 80.

The groove formed on the light guide plate 40 will be explained below with reference to FIG. 2A through FIG 4.

Figure 2A:
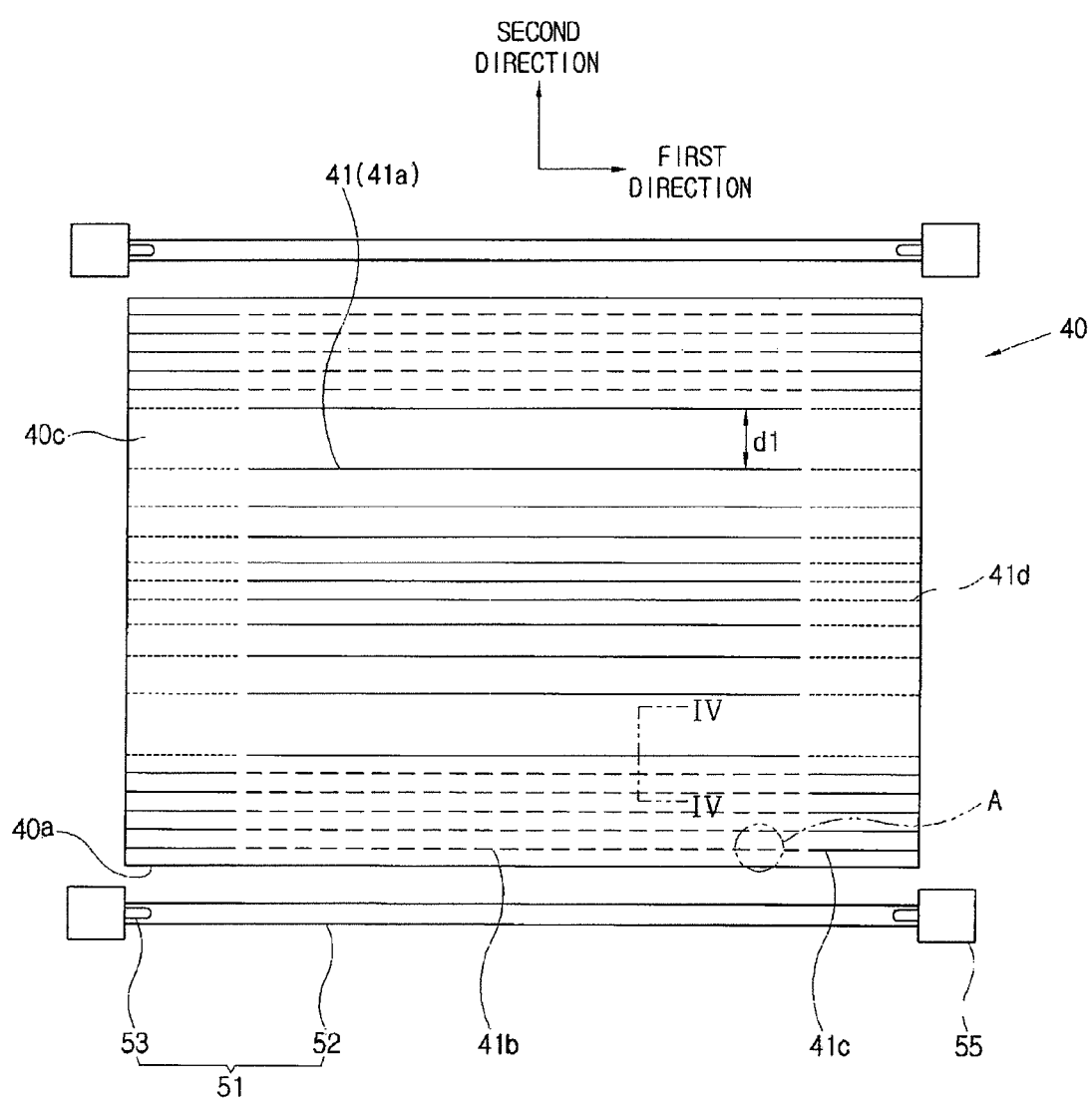
FIG. 2A and FIG. 2B show a reflecting surface of a light guide plate in the liquid crystal display device according the exemplary embodiment of the present invention shown in FIG. 1.

As shown in FIG. 2A, a plurality of grooves 41 are formed on the reflecting surface 40c of the light guide plate 40. The grooves 41 extended in a first direction. The grooves 41 are provided with various lengths, intervals in the first direction, and intervals in a second direction, but are distributed symmetrically about the center of the reflecting surface 40c. Here, the first direction is parallel to the direction that the light source unit 50 extends in and the first direction is perpendicular to the second direction.

Figure 3:
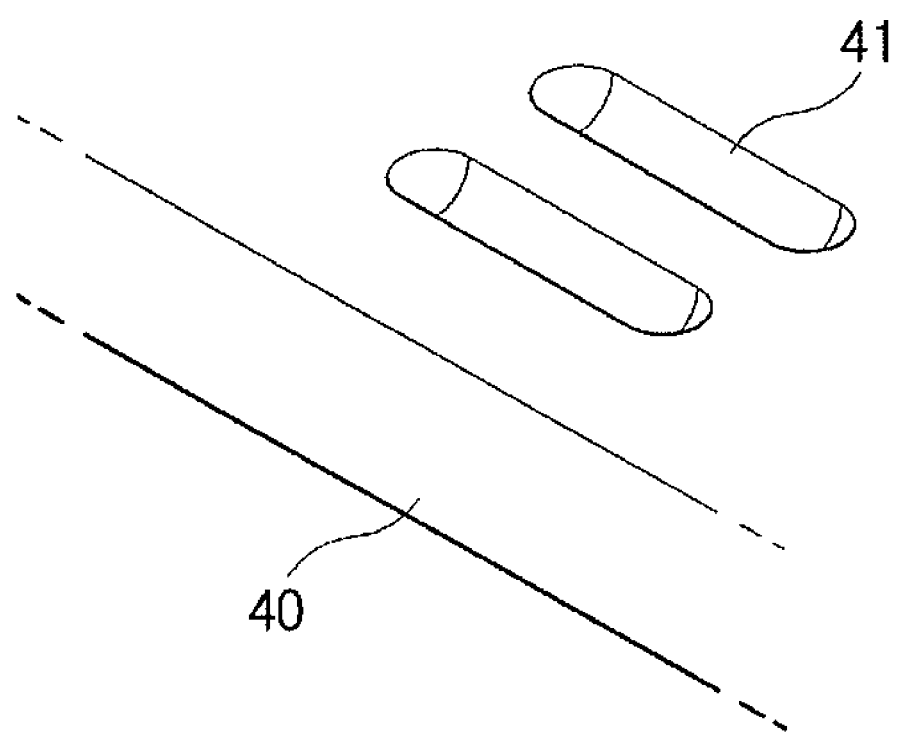
FIG. 3 is a perspective view enlarging a part 'A' of FIG. 2A.
Figure 4:
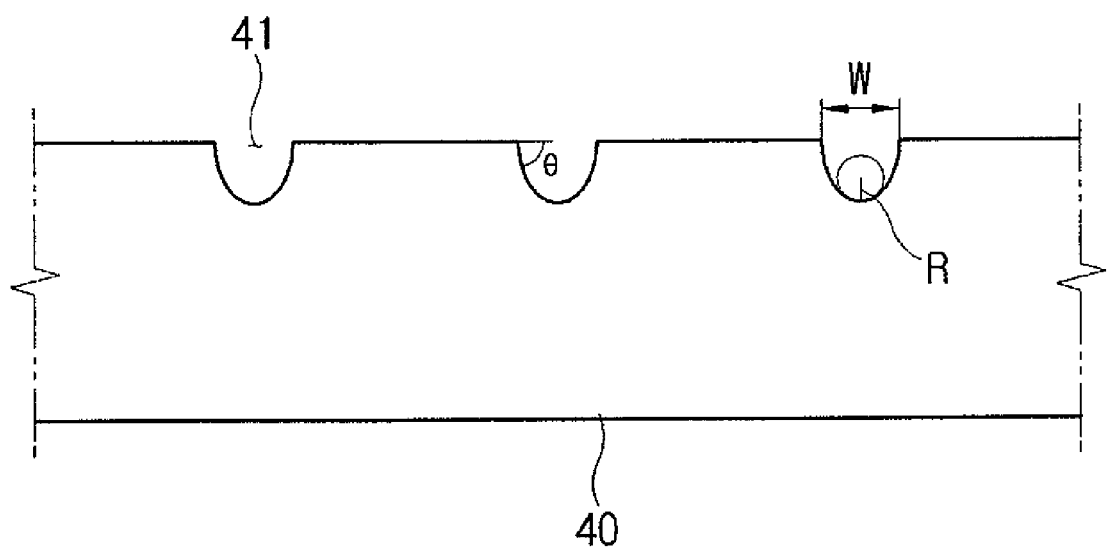
FIG. 4 is a sectional view of the light guide plate of FIGS. 2A and 2B cut along IV-IV.

The shape of the grooves 41 are shown in FIG. 3 and FIG. 4. A cross section width 'W' of the grooves 41 is within the range of approximately 100 μm and approximately 300 μm, an inclined angle θ is within the range of approximately 30° and approximately 55°, and an apex radius 'R' is within the range of approximately 30 μm and approximately 80 μm.

Figure 2B:
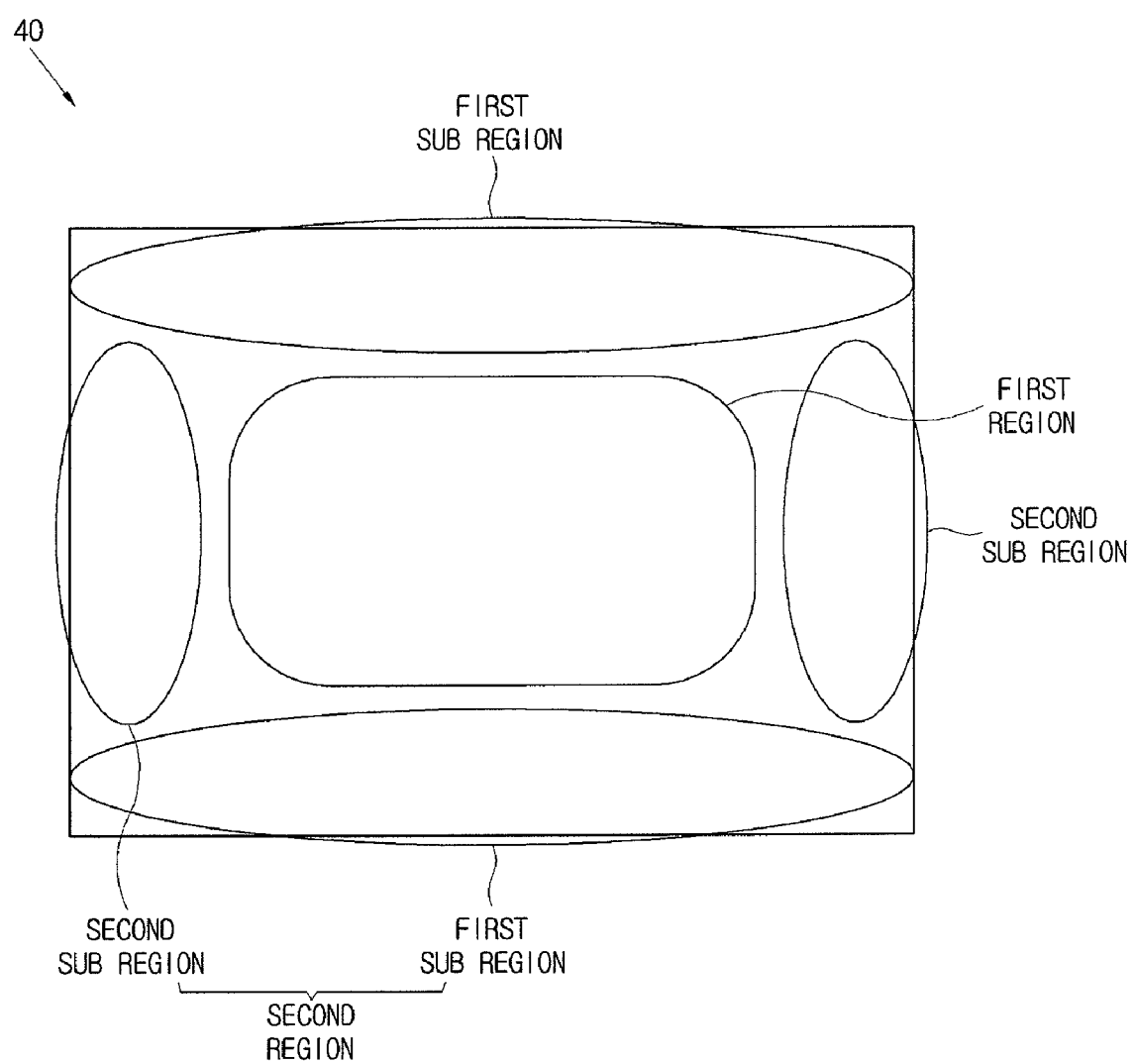

FIG. 2B shows the reflecting surface 40c divided by a first region at the center and a second region surrounding the first region. The second region includes a pair of first sub regions adjacent to the light source 50 and extending in the first direction and a pair of second sub regions extended in the second direction along the side edge of the reflecting surface 40c.

Grooves 41a (FIG. 2A) are located in the first region and are comparatively long. The density of the grooves in the first region is comparatively low. Here, the density is calculated as the number of grooves 41 per unit area counting the number of grooves without regard to length. The low groove density means that the number of ends of the grooves 41 is few per unit area.

The interval d1 between the grooves 41a in the first region along the second direction increases as a distance from the center increases. Accordingly, the center of the reflecting surface 40c has the highest groove density within the first region. The interval may be between approximately 0.2 mm and approximately 1.0 mm.

Each of the two first sub regions is divided into two parts by grooves 41b and grooves 41c. The grooves 41b at the middle of the first sub region are comparatively short but the grooves 41c at both end portions of the first sub region are comparatively long. The first sub region has the higher groove density than the first region. The grooves 41b and 41c in the first sub region have constant interval along the second direction. The length of the groove 41b at the middle of the first sub region may be between approximately 0.3 mm and approximately 20 mm.

The comparatively long grooves 41c are formed at both ends of the lamp 51. The lamp 51 includes a main lamp body 52, and electrode parts 53 at the both ends of the lamp 51. In the electrode parts 53, luminance is comparatively low.

Grooves 41d in the second sub region are arranged parallel to the grooves 41a in the first region. The grooves 41d in the second sub region are provided with their lengths shorter than those of the grooves 41b and 41c in the first sub region. The groove density of the second sub region is higher than those of the first region and the first sub region. The grooves 41d have the highest density at the middle of the second sub region. The length of the grooves in the second sub region may be between approximately 0.3 mm and approximately 20 mm.

The grooves 41b and 41d according to the present exemplary embodiment are arranged to align along the second direction, but may be arranged in a direction that is diagonal to the second direction.

Each of the grooves 41a in the first region and the grooves 41d in the second sub region are disposed in a straight line in the first direction, but embodiments of the present invention are not limited thereto.

Figure 5:
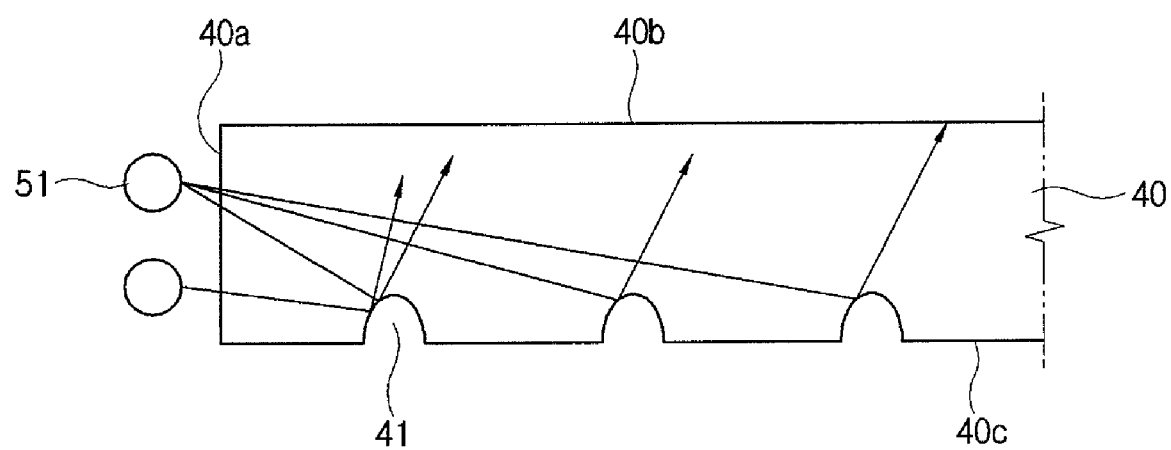
FIG. 5 shows a luminance enhancement in the liquid crystal display device according to the exemplary embodiment of the present invention shown in FIG. 1.

According to the groove arrangement of exemplary embodiments of the present invention, the light guide 40 can uniformly supply high luminous light. An example of this is explained with referring to FIG. 5 and FIG. 6. FIG. 5 shows an enhancement of a luminance in the liquid crystal display device 1 and FIG. 6 shows the uniformity of the luminance in the liquid crystal display device 1 according to an exemplary embodiment of the present invention.

FIG. 5 shows an incident light exiting from the lamp 51 to the inside of the light guide plate 40 through the incident side surface 40a. The light incident to the light guide 40 is reflected to the diffusion film 31 through the exiting surface 40b.

A considerable portion of the light incident to the light guide plate 40 is reflected at the grooves 41 in the reflecting surface 40c and refracted upward. The increased amount of light directed towards the diffusion film 31 increases the luminance.

Figure 6:
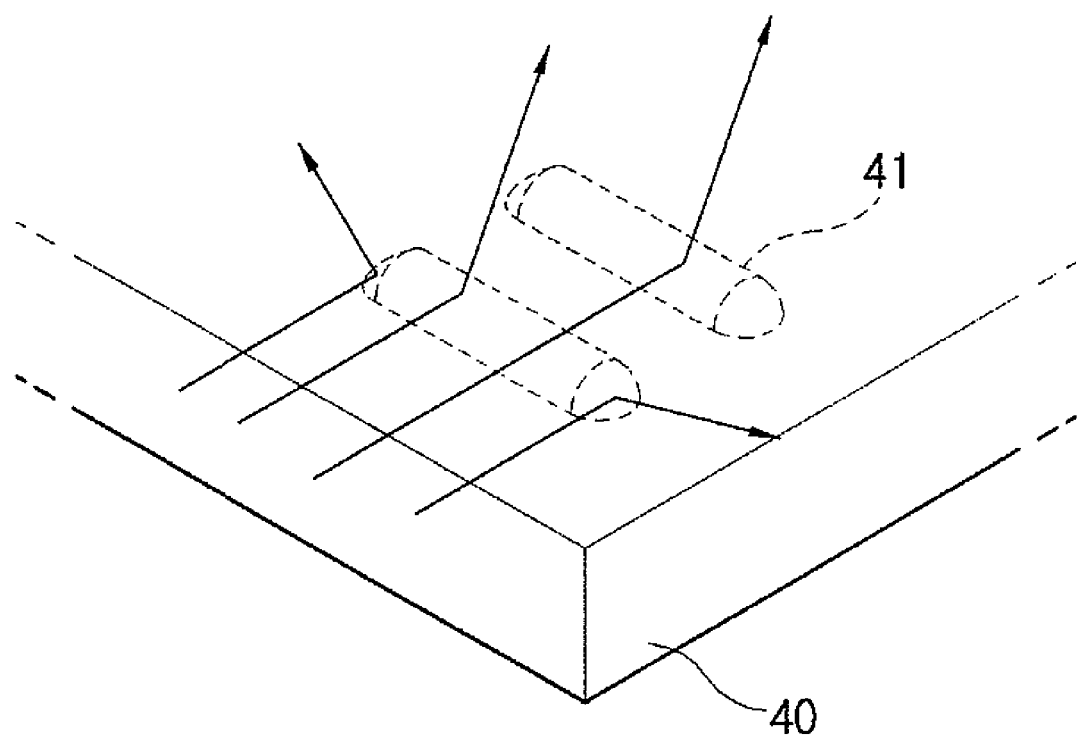
FIG. 6 shows uniformity in luminance in the liquid crystal display device according to the exemplary embodiment of the present invention shown in FIG. 1.

FIG. 6 shows a part of the light from the lamp 51 incident to ends of the grooves 41. The light incident to the ends of the grooves 41 changes its path to various directions that results in a uniform distribution of the light throughout the whole light guide plate 40.

FIG. 5 and FIG. 6 illustrate an increase of luminance by the long continuous grooves 41 and an enhancement of light uniformity by the short grooves 41 with high groove density (many groove ends per unit area).

Turning back to FIG 2A and FIG. 2B, the long extended grooves 41a in the first region mainly increase luminance. The light from the light source unit 50 tends to become dimmer towards the center of the reflecting surface 40c. In order to compensate for this, the grooves 41a in the first region are most dense around the center of the reflecting surface 40c.

The grooves 41b in the middle of the first sub region are responsible for sending the light of the light source unit 50 to the first region. For this, the groove density in the first sub region is higher than that of the first region. The grooves 41c at the ends of the first sub region are comparatively long. The grooves 41c increase the luminance of the otherwise dimmer light from the electrode part 53. For this, the groove density at the ends of first sub region is lower than that of the middle part of the first sub region.

The groove density of second sub region is higher than that of the first sub region. The highest groove density is around the middle in the second sub region. The center of the reflecting surface 40c is supplied with a lot of light from the lamp 51 while the side edges of the reflecting surface 40c in the first direction is supplied with less light. Accordingly, a difference in luminance may occur between the center part and the side edge parts of the reflecting surface 40c. According to an exemplary embodiment of the present invention, the groove density is higher in the second sub region to accomplish a uniform luminance.

As described above, light of high luminance and good uniformity exits the light guide plate 40. This allows for the elimination of the diffusion film 31 and/or the prism film.

Though not shown, a pattern for diffusion and polarization may be formed on the exiting surface 40b of the light guide plate 40.

Figure 7:
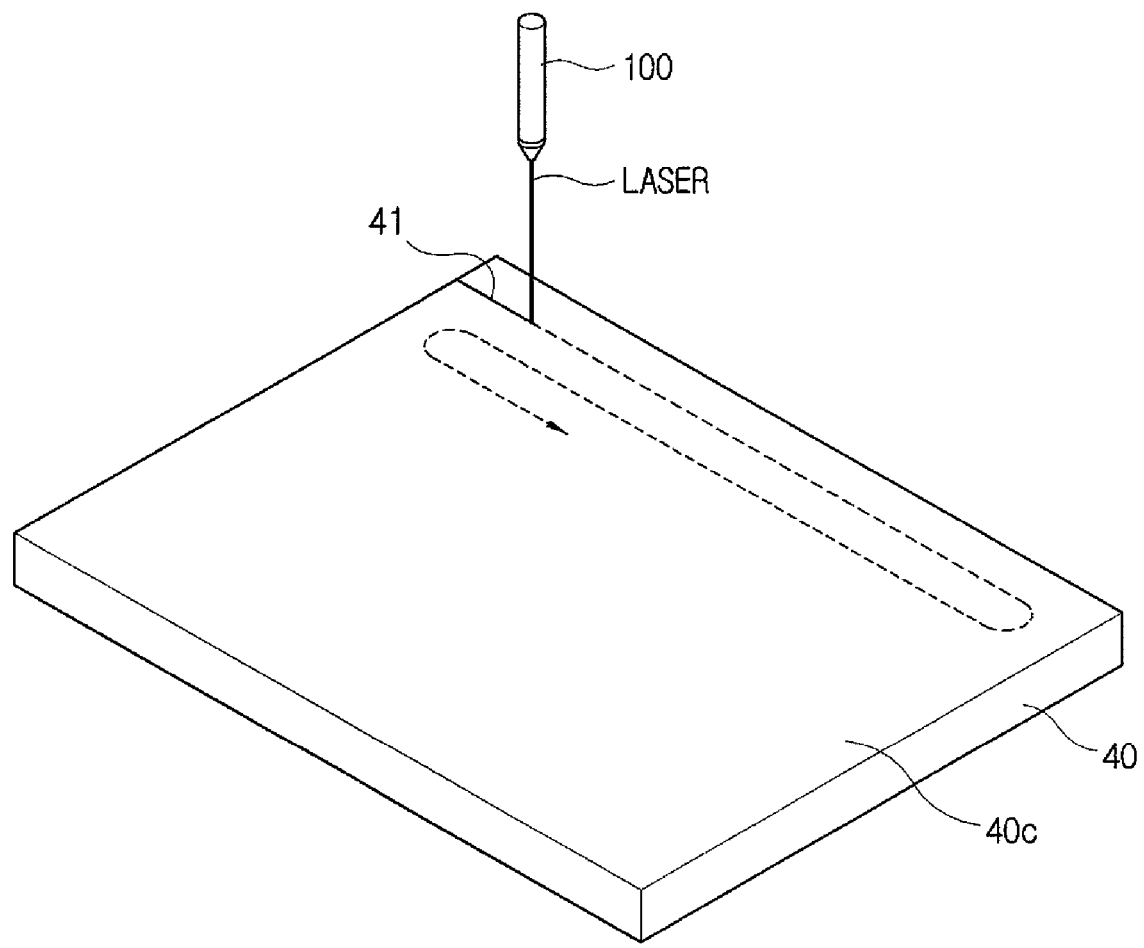
FIG. 7 shows a method of manufacturing the liquid crystal display device according to the exemplary embodiment of the present invention shown in FIG 1.

FIG. 7 illustrates a method for manufacturing the liquid crystal display device 1 according to an exemplary embodiment of the present invention. FIG. 7 shows a process of forming the grooves 41.

The light guide plate 40 includes polymethylmethacrylate (PMMA) and poly methylstyrene (PMS). The light guide plate 40 is manufactured by extrusion. The grooves 41 in the light guide plate 40 are formed using a laser device 100. The laser device 100 illuminates the light guide plat 40 using, for example, a carbon dioxide laser. The energy of the laser may be on the order of tens or hundreds of Watts.

The laser device 100 moves in a zigzag pattern scanning the whole surface of the reflecting surface 40c while the laser illuminates intermittently. The laser device 100 may be provided with an optical switch (not shown) to provide the intermittent illumination. The grooves 41 are formed on the laser illuminated reflecting surface 40c after a volatilization of melted polymers. The width 'W' of the grooves 41, the apex radios 'R', the incline angle 'θ', etc. are modulated by the laser energy, scanning speed, focused spot diameter of laser, etc.

Alternatively, the light guide plate 40 may be formed by injection molding. A mold with embossed carvings corresponding to the grooves 41 is used for the injection.

Figure 8A:
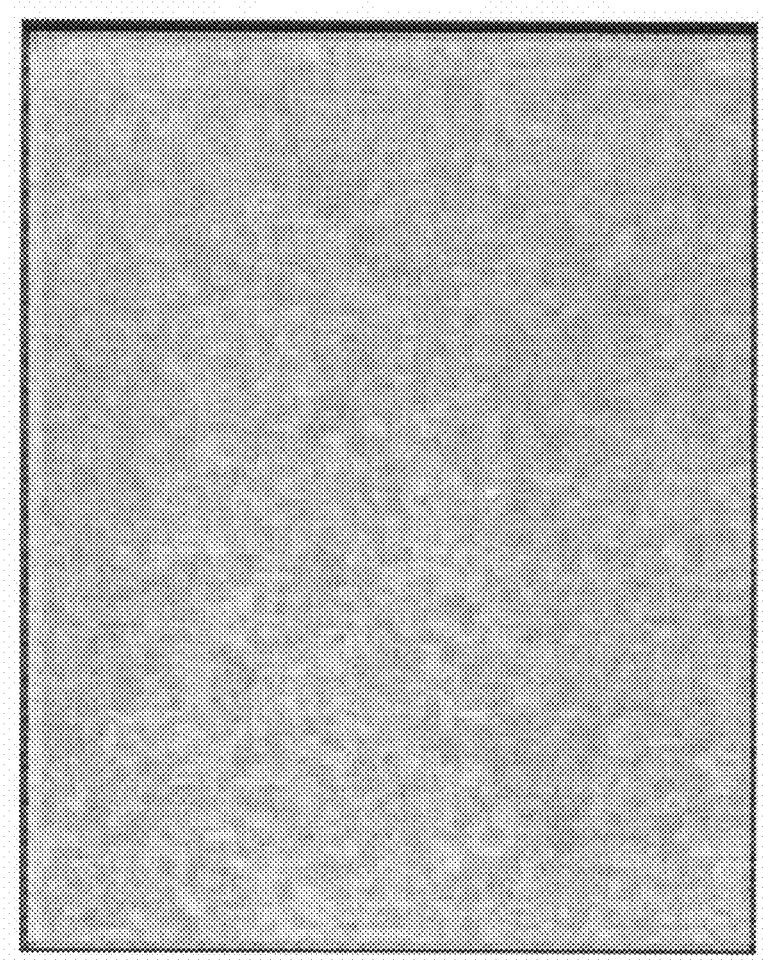
FIG. 8A through FIG. 8C are test results showing a display quality of the liquid crystal display device according to the exemplary embodiment of the present invention shown in FIG. 1.
Figure 8B:
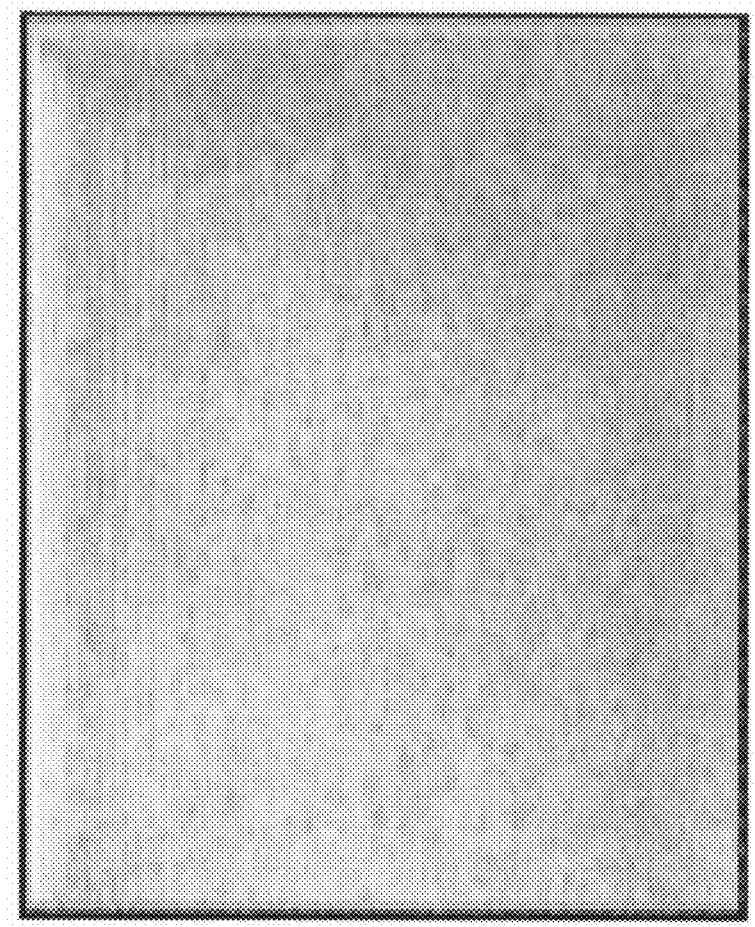
Figure 8C:
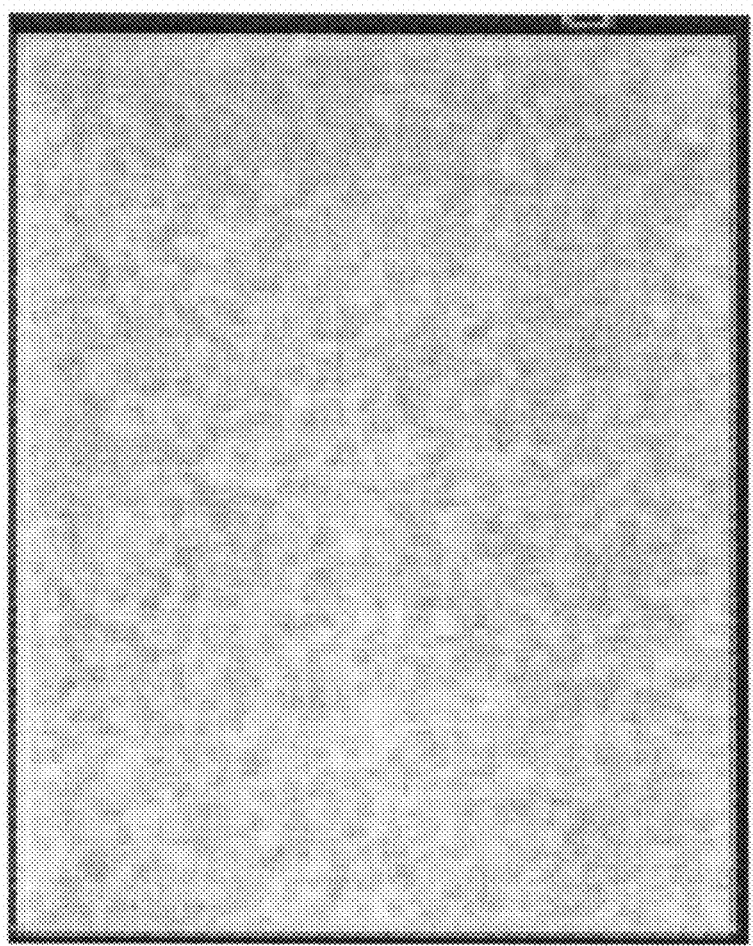

FIG. 8A through FIG. 8C illustrate display quality results of the liquid crystal display device 1 according to an exemplary embodiment of the present invention. FIG. 8A and FIG. 8B illustrate a first comparative example result and a second comparative example result, respectively, and FIG. 8C illustrates the result of the exemplary embodiment of the present invention.

FIG. 8A through FIG. 8C illustrate the luminance distributions from the exiting surface by changing the groove arrangements in the reflecting surface. The light guide plate used for a test has a rectangular shape with a diagonal length of 17 inch and a thickness of 6 mm. Lamps disposed along two longer edges of the light guide plate are used as a light source. The length of the grooves in each of the first and the second examples are identical one another. Comparatively short grooves are arranged discontinuously in the first comparative example. Longer grooves are arranged and extended continuously from one edge to the other edge of the light guide plate in the second comparative example. The groove ends are formed at only the edges of the light guide plate. According to the exemplary embodiment of the present invention, comparatively long grooves are formed at the middle and comparatively short grooves are formed around them. The first comparative example has the highest groove density and the second comparative example has the lowest groove density.

The table below shows experimental results including the amount of light for each example. A relative amount of light is calculated by assuming the amount of second comparative example light as 100%.

TABLE

| | First comparative example | Second comparative example | Exemplary Embodiment |
|---|---|---|---|
| Groove pattern | Discontinuous arrangement short grooves, | Continuous long grooves, | Center: continuous long grooves<br>Edges: discontinuous short grooves |
| Groove density | high | low | Intermediate (center: low, edges: high) |
| Amount of light | 91% | 100% | 99% |

FIG. 8A representing the first comparative example shows a uniform light distribution across the whole exiting surface. Here, the value of light observed is 91% indicating a relatively low light value. The first comparative example has the uniform light distribution throughout the light guide plate from the high groove density but suffers from relatively low luminance. Accordingly, the display quality may be degraded by the weak luminance if the light guide plate of the first comparative example is used.

FIG. 8B representing the second comparative example shows an non-uniform light distribution depending on the location of the exiting surface but has a higher luminance than the first comparative example. The second comparative example enhances a light luminance but has difficulties in supplying uniform light from the left and right sides. Accordingly, the display quality may be degraded by the non-uniform luminance distribution if the light guide plate of the second example is used.

FIG. 8C representing the exemplary embodiment of the present invention. Here, the light distribution across the whole exiting surface is comparatively uniform. The light amount 99% is higher than the first example and has level similar to the second example. The long grooves in the center increase the luminance and the short grooves in the edges make light distribution uniform. The exemplary embodiment of the present invention enhances the display quality by uniformly supplying light of high luminance.

Figure 9:
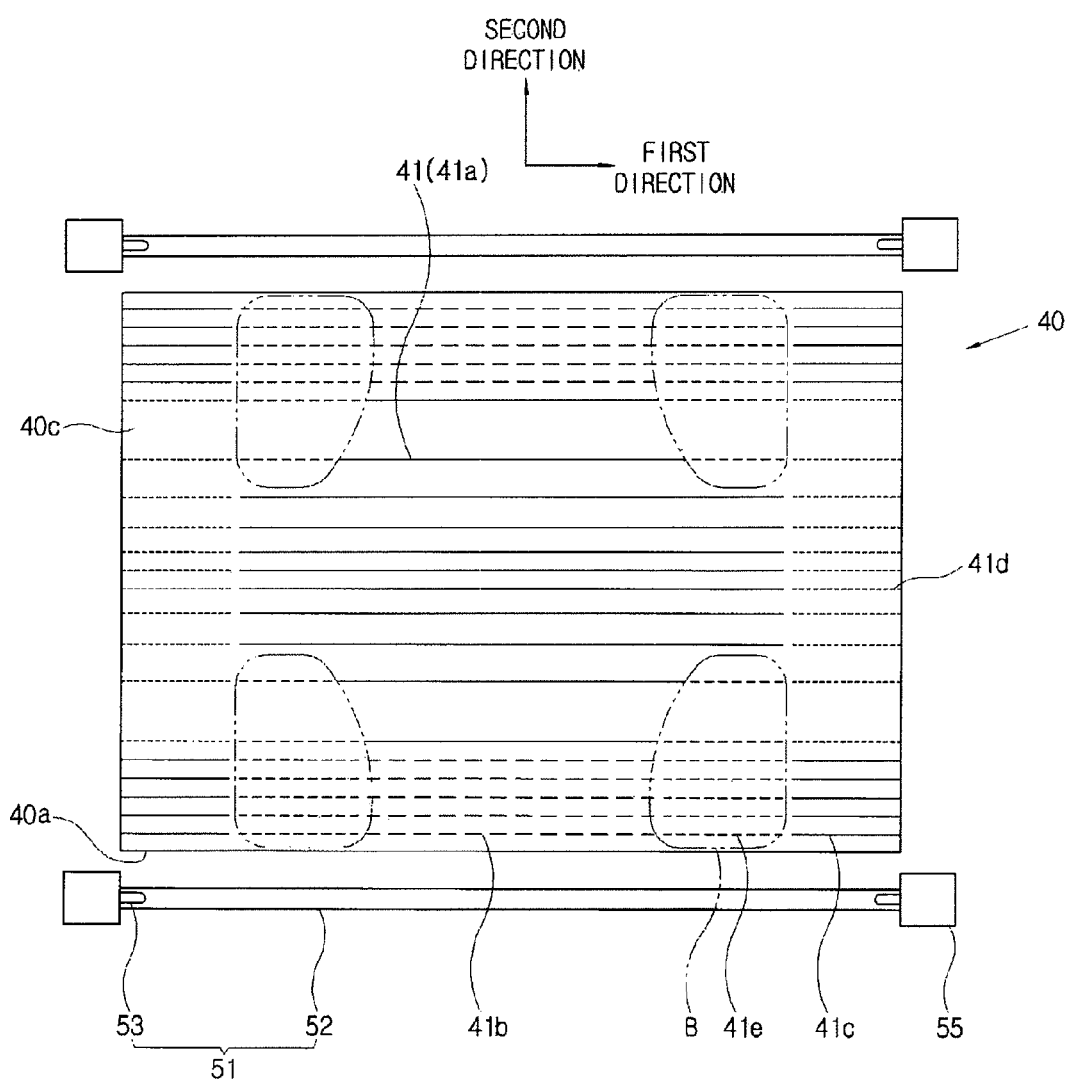
FIG. 9 through FIG. 11 show light guide plates in the liquid display devices according to exemplary embodiments of the present invention.
Figure 10:
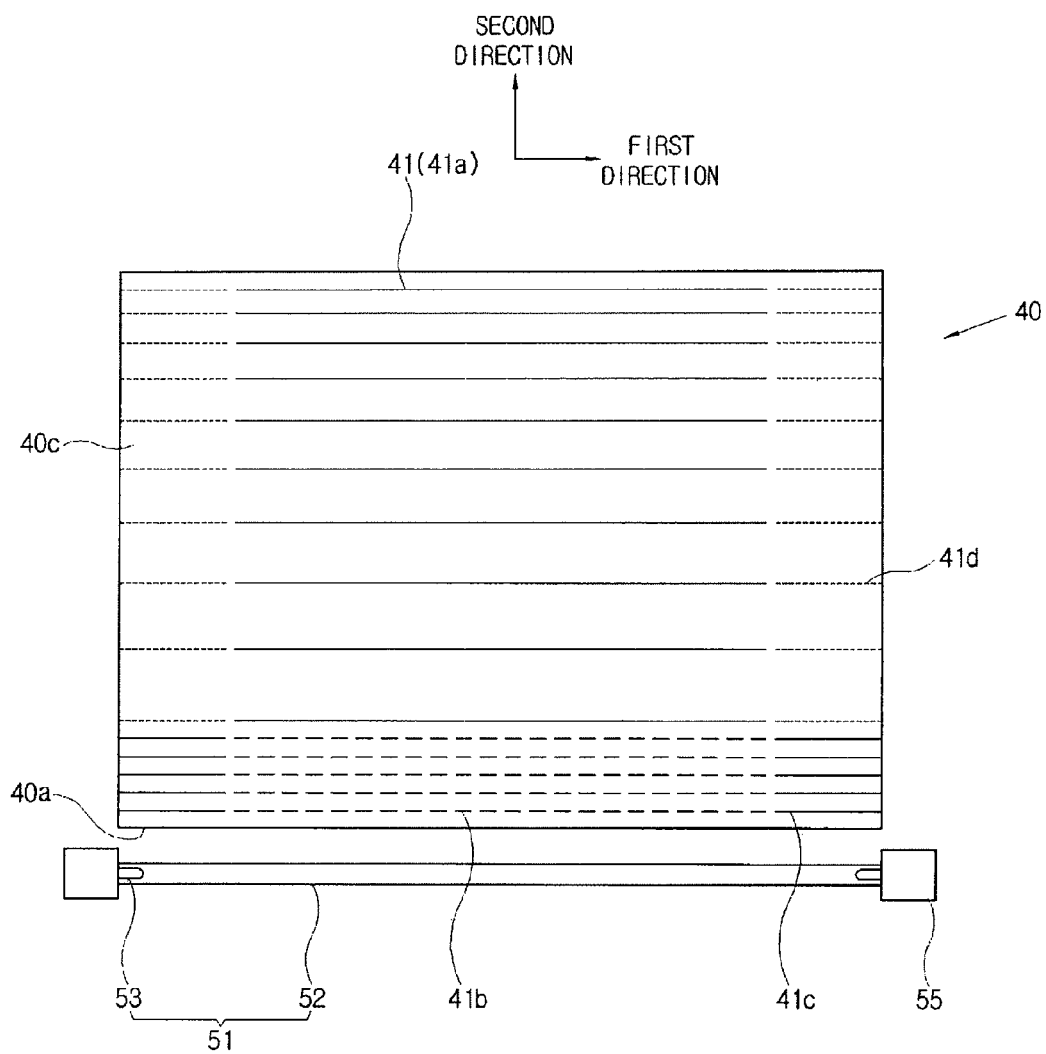
Figure 11:
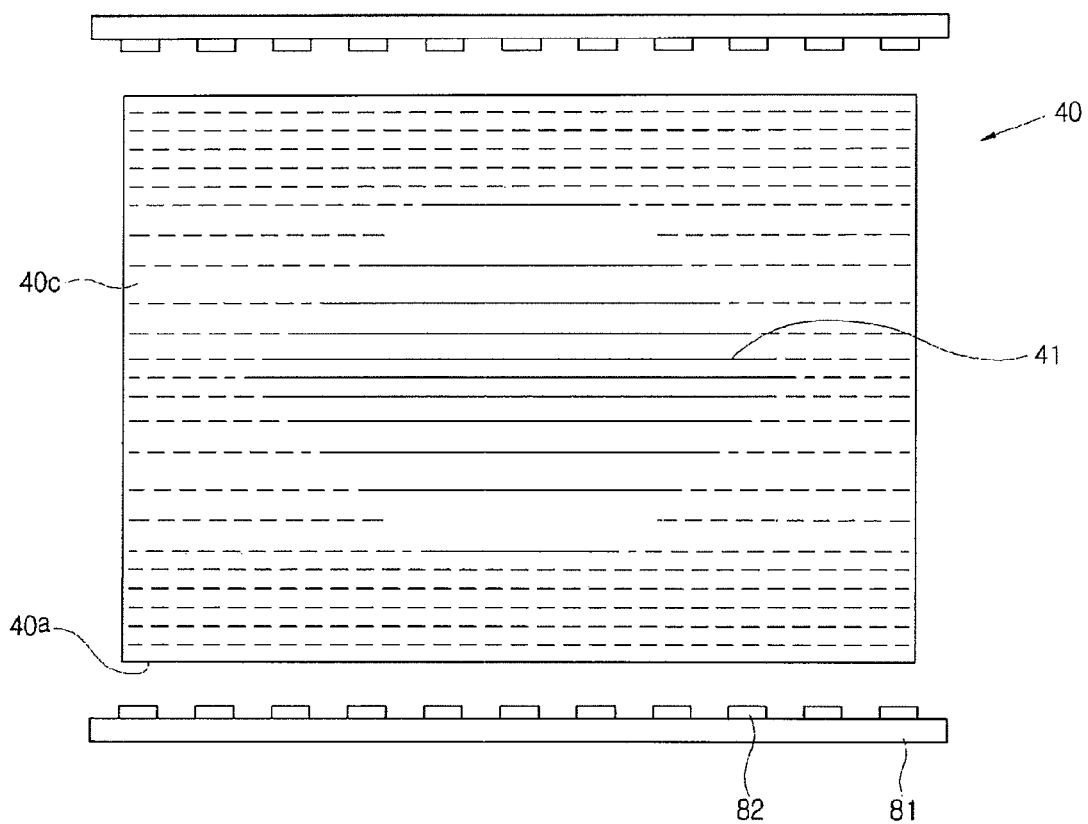

FIG. 9 through FIG. 11 illustrate reflecting surfaces of the liquid crystal display devices according to exemplary embodiments of the present invention.

As shown in FIG. 9, three kinds of grooves 41b, 41c and 41e exist in a first sub region. Grooves 41e in a region 'B' are disposed at both sides of grooves 41b in the middle of the first sub region. The grooves 41e in the 'B' region are shorter than the grooves 41b in the middle and thus the groove density in the region 'B' is higher than that in the middle of the first sub region.

According to another exemplary embodiment, the grooves 41b in the middle of the first sub region send the light to the first region and the grooves 41e send the light to the second sub region.

Groove lengths per a unit area in the middle of the first sub region and the region 'B' may be identical.

As shown in FIG. 10, a light source unit 50 is disposed only in one edge side of a light guide plate 40. This embodiment may be particularly effective where the size of the liquid crystal display is comparatively small.

According to another exemplary embodiment, a first sub region is disposed only at the side adjacent to the light source 50. A part of a first region is extended to an end edge side of the reflecting surface 40c without being surrounded by a second region.

As shown in FIG. 11, a light source unit 80 includes a light emitting diode 82 and a circuit substrate 81 mounted with the light emitting diode 82.

According to another exemplary embodiment, the light source unit 80 supplies uniform light independent of location. Accordingly, patterns at the middle and at both ends of a first sub region may be identical.

As is apparent from the above description, the present disclosure provides a liquid crystal display device having excellent light luminance and uniformity.

In addition, the present disclosure provides the liquid crystal display device with a light guide plate supplying a highly luminous and uniform light.

Although exemplary embodiments of the present invention have been shown and described, it will be appreciated by those skilled in the art that changes may be made in these embodiments without departing from the principles and spirit of the disclosure.

What is claimed is:

1. A liquid crystal display device comprising:
   a liquid crystal display panel;
   a light guide plate, disposed at a rear side of the liquid crystal display panel, having an exiting surface facing the liquid crystal display panel and a reflecting surface opposite the exiting surface; and
   a light source unit disposed along at least one side of the light guide plate,
   the reflecting surface comprising a first region formed with a plurality of first-region grooves of a first length and a second region formed with a plurality of second-region grooves of a second length shorter than the first length, wherein a longitudinal axis of the first region and a longitudinal axis of the second region are parallel to or perpendicular to the at least one side of the light guide plate.

2. The liquid crystal display device according to claim 1, wherein each of the plurality of first-region grooves and each of the plurality of second-region grooves extend parallel to the light source unit.

3. The liquid crystal display device according to claim 1, wherein the light source unit comprise a pair of light source elements facing each other with the light guide plate therebetween.

4. The liquid crystal display device according to claim 1, wherein the first region is disposed at a center of the reflecting surface and the second region surrounds the first region.

5. The liquid crystal display device according to claim 1, wherein an interval between proximate first-region grooves in the first region increases as a distance from the center of the reflecting surface increases.

6. The liquid crystal display device according to claim 1, wherein each of the first-region grooves in the first region is continuously extended.

7. A liquid crystal display device comprising:
   a liquid crystal display panel;
   a light guide plate, disposed at a rear side of the liquid crystal display panel, having an exiting surface facing the liquid crystal display panel and a reflecting surface opposite the exiting surface; and
   a light source unit disposed along at least one side of the light guide plate,
   the reflecting surface comprising a first region formed with a plurality of first-region grooves of a first length and a second region formed with a plurality of second-region grooves of a second length shorter than the first length,
   wherein the second region comprises a pair of first sub regions, extended along an edge side of the reflecting surface facing the light source unit, and a pair of second sub regions extended along a direction perpendicular to the light source unit, and the second-region grooves that are located in the second sub region are shorter than the second-region grooves that are located in the first sub region.

8. The liquid crystal display device according to claim 7, wherein an interval between proximate second-region grooves that are located in the second sub region increases as a distance from the center of the reflecting surface increases.

9. The liquid crystal display device according to claim 7, wherein the length of the second-region grooves that are located in the middle of the first sub region is longer than the length of the second-region grooves that are located between the middle of the first sub region and the second sub region.

10. The liquid crystal display device according to claim 7,
wherein the light source unit comprises a lamp comprising an electrode part and a lamp main body, and
the second-region grooves located in the first sub region proximate to the electrode part are longer than the second-region grooves located in the first sub region proximate to the lamp main body.

11. The liquid crystal display device according to claim 7, wherein the light source unit comprises a light emitting diode and the second-region grooves located in the first sub region each have the same length.

12. The liquid crystal display device according to claim 1, wherein the first-region grooves and the second-region grooves are each formed using a laser.

13. The liquid crystal display device according to claim 12, wherein the laser is a carbon dioxide laser.

14. The liquid crystal display device according to claim 1, wherein each of the first-region grooves and the second-region grooves has a cross sectional surface of a prism shape.

15. The liquid crystal display device according to claim 14, wherein the cross sectional surface of the first-region and second-region grooves has a width between approximately 100 μm and approximately 300 μm, an inclined angle between approximately 30° and approximately 55°, and an apex radius between approximately 30 μm and approximately 80 μm.

16. The liquid crystal display device according to claim 1, wherein the light guide plate includes polymethylmethacrylate (PMMA) and poly methylstyrene (PMS).

17. The liquid crystal display device according to claim 1, wherein the light guide plate is manufactured through extrusion with the first-region and second region grooves that are formed by a laser.

18. A liquid crystal display device comprising:
a liquid crystal display panel;
a light guide plate, disposed at a rear side of the liquid crystal display panel, having an exiting surface facing the liquid crystal display panel and a reflecting surface opposite the exiting surface; and
a pair of light source units disposed with the light guide plate therebetween,
the reflecting surface comprising a first region comprising a plurality of first-region grooves and a second region comprising a plurality of second-region grooves, the second region surrounding the first region, wherein the second-region grooves have a groove density higher than the first-region grooves, wherein a longitudinal axis of the first region and a longitudinal axis of the second region are parallel to or perpendicular to the at least one side of the light guide plate.

19. The liquid crystal display device according to claim 18, wherein the first region is disposed at a center of the reflecting surface.

20. A liquid crystal display device comprising:
a liquid crystal display panel;
a light guide plate, disposed at a rear side of the liquid crystal display panel, having an exiting surface facing the liquid crystal display panel and a reflecting surface opposite the exiting surface; and
a pair of light source units disposed with the light guide plate therebetween,
the reflecting surface comprising a first region comprising a plurality of first-region grooves and a second region comprising a plurality of second-region grooves, the second region surrounding the first region, wherein the second-region grooves have a groove density higher than the first-region grooves,
wherein the second region comprises a pair of first sub regions, extended along the edge side of the reflecting surface facing the light source unit, and a pair of second sub regions disposed in the sides of the first region and extending perpendicular to each of the pair of light source units, and
a groove density of the first-region grooves located in the second sub region is higher than a groove density of the first-region grooves located in the first sub region.

21. A light guide plate having a reflecting surface formed with a plurality of grooves, the reflecting surface comprising:
a first region, and
a second region having a groove density that is higher than a groove density of the first region, the second region surrounding the first region, wherein a longitudinal axis of the first region and a longitudinal axis of the second region are parallel to or perpendicular to the at least one side of the light guide plate.

22. The light guide plate according to claim 21, wherein the first region is disposed at the center of the reflecting surface.

23. A light guide plate having a reflecting surface formed with a plurality of grooves, the reflecting surface comprising:
a first region, and
a second region having a groove density that is higher than a groove density of the first region, the second region surrounding the first region, wherein the light guide plate has a rectangular plate shape,
the second region comprises a pair of first sub regions extended along a first pair of parallel sides of the reflecting surface and a pair of second sub regions extended along a second pair of parallel sides of the reflecting surface, the first pair of parallel sides being perpendicular to the second pair of parallel sides, and
a groove density in the second sub region is higher than a groove density in the first region.

24. The light guide plate according to claim 21, wherein the plurality of grooves is formed using a carbon dioxide laser.

25. The light guide plate according to claim 21, wherein each of the plurality of grooves has a cross sectional surface of a prism shape, and
the cross sectional surface of each groove has a width between approximately 100 μm and approximately 300 μm, an inclined angle between approximately 30° and approximately 55°, and an apex radius between approximately 30 μm and approximately 80 μm.

26. The light guide plate according to claim 21, wherein the light guide plate includes polymethylmethacrylate (PMMA) and poly methylstyrene (PMS) and is manufactured through extrusion with the grooves being formed by a laser.

* * * * *